Jan. 30, 1968

I. R. JOHNSON 3,365,985

POWER TRANSMISSION

Filed Oct. 24, 1965

INVENTOR.
Ivan R. Johnson
BY
a. m. Heiter
ATTORNEY

3,365,985
POWER TRANSMISSION

Ivan R. Johnson, Royal Oak, Mich., assignor to General Motors Corporation, Detroit, Mich., a corporation of Delaware
Filed Oct. 24, 1965, Ser. No. 504,909
7 Claims. (Cl. 74—761)

ABSTRACT OF THE DISCLOSURE

A torque converter transmission having separate power dividing and power combining planetary gear sets each with an input gear driven by the converter turbine and conditionable to cooperatively provide a plurality of drive ratios. The power dividing gear sets has an output connected to another input gear of the power combining gear set and has a control gear controlled by a clutch for a lock-up condition or by a brake for an underdrive condition. The brake and clutch are controlled by telescopically mounted pistons having a common control chamber therebetween which when supplied with operating oil causes one piston to effect clutch engagement and the other piston to release the brake to provide an overlapping power shift from a reduction drive to direct drive. Reverse and low range drives are achieved by controlling the power combining planetary gear set with the power dividing gear set released.

---

This invention relates to improvements in multi-ratio power transmissions and particularly to an improved assembly of motor mechanisms and cooperating friction-drive establishing devices selectively conditionable to effect a smooth overlap ratio change in the transmission.

The transmission of this invention features a wide range of drive ratios controlled by a minimum number of clutches and brakes hereinafter referred to as friction-drive establishing devices which provide a controlled torque capacity overlap on ratio change to insure a continuous and smooth flow of power through the transmission and to eliminate the possibility of a "no torque shift" and "engine flair." The friction-drive-establishing devices of this invention are provided by separate concentrically-mounted friction plate packs operated by motors telescopically arranged to provide a common control chamber so that a predetermined control pressure will cause gradual increase in torque-transmitting capacity in one friction plate pack and gradual decrease in torque reaction capacity in another friction plate pack for effecting soft overlap shift from one ratio to another.

It is an object of this invention to provide a new and improved multi-ratio transmission featuring a plurality of friction devices which may be selectively conditioned by motor mechanisms for improved overlap shifts.

Another object of this invention is to provide a multi-ratio transmission having a planetary gear unit controlled by an improved arrangement of friction-drive-establishing devices to effect a smooth overlap shift in which the friction-drive-establishing devices cooperatively control a common element in the gear unit; initially conditioning the element for torque reaction and subsequently conditioning the element for gradually increasing torque transmittal.

A further object of this invention is to provide a power train having a power-combining gear unit for establishing a low range drive with single input drive and a plurality of higher drives with split torque input; and further having a multi-ratio gear unit conditionable to establish a reduction drive as a second input to the power-combining unit and a direct drive to the power-combining unit for a third and higher range split torque drive.

A further object of this invention is to provide a multi-ratio transmission having an improved ratio-changing structure which provides for controlled torque capacity overlap between concentrically-mounted first and second friction-drive-establishing devices for conditioning a planetary gear unit for a plurality of drive ranges in which telecoping motors are controlled by a common pressure chamber which permits one motor to gradually engage one friction-drive-establishing device and the other motor to gradually and simultaneously release the other friction-drive-establishing device to effect a full power shift.

Figure 1:
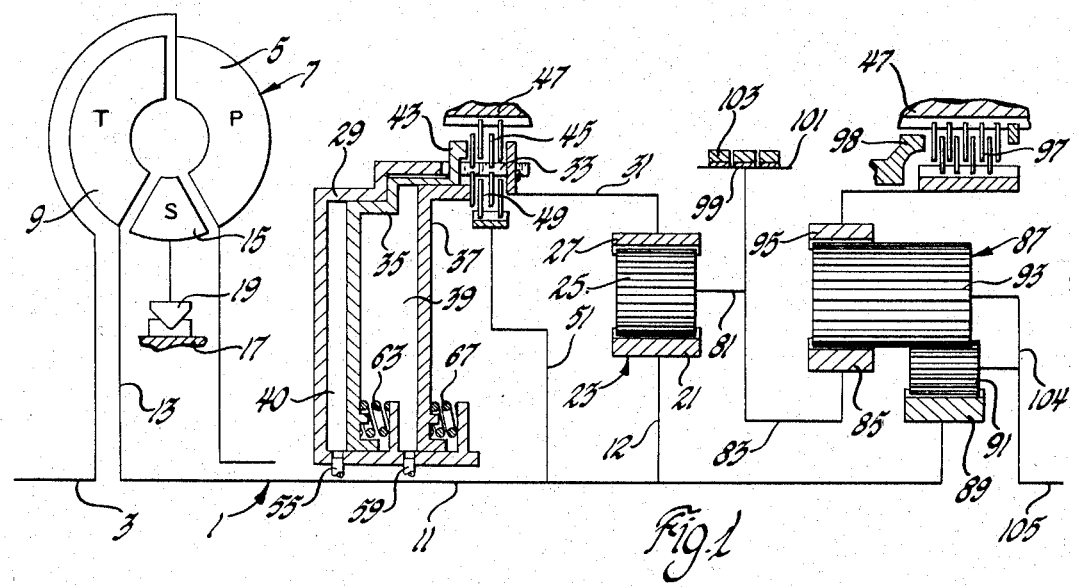
Figure 2:
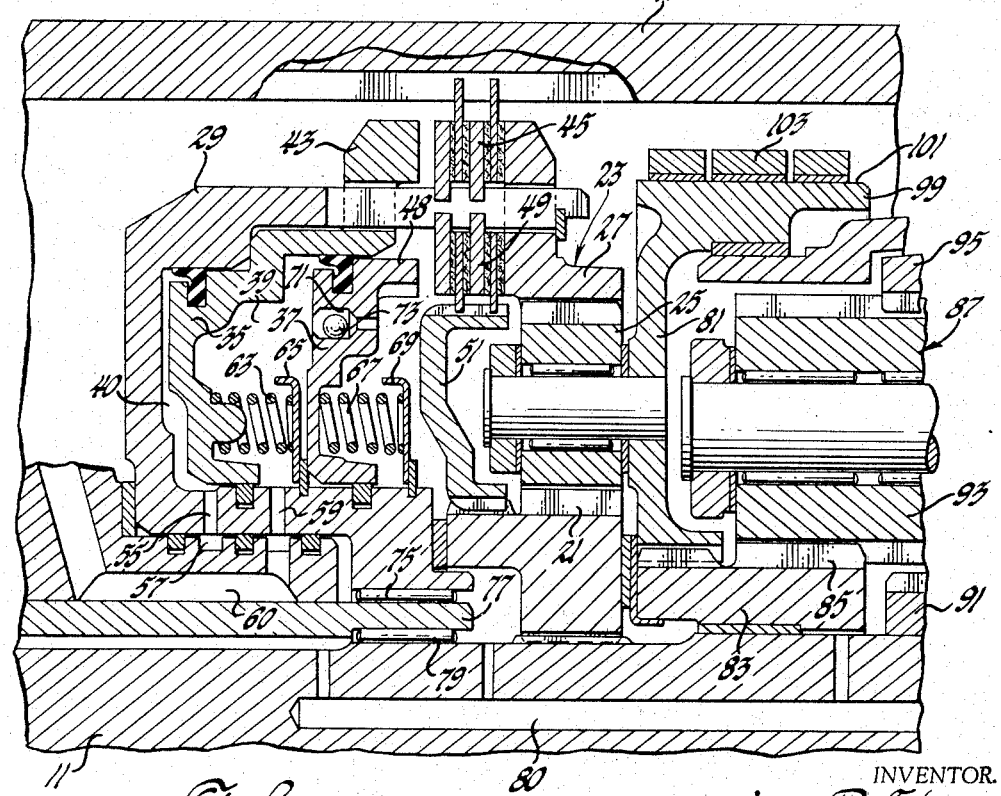

These and other objects will become more apparent from the following description and drawings in which:

FIGURE 1 is a diagrammatic view showing the upper half of a torque converter transmission, and FIGURE 2 is a sectional view of a portion of the transmission shown diagrammatically in FIG. 1.

Turning now to FIGURE 1, there is shown a torque converter transmission 1 including a power input shaft 3 connected to drive the bladed pump 5 of a hydrodynamic torque converter 7 while converter turbine 9 is connected to drive a main shaft 11 through hub 13. Located in conventional manner between the turbine 9 and pump 5 is a bladed stator 15 connected to ground 17 by conventional one-way brake 19. In one phase of operation the stator provides reaction permitting the converter to multiply torque. In another phase of operation the stator freewheels in a forward direction by virtue of the one-way brake 19 and the converter acts as an efficient fluid coupling.

The main shaft 11 is connected by hub 12 to drive sun gear 21 of a power-dividing planetary gear set 23 which includes planetary pinions 25 meshing with the sun gear, and a ring gear 27 meshing with the pinions in the well known manner. The ring gear is operatively connected to annular piston housing 29 by an extension 31 having an end portion that extends through a slot 33 in that housing. The piston housing contains two annular pistons or motors 35 and 37 compactly arranged, the latter telescoped within the former and establishing therebetween a control chamber 39, shown best in FIG. 2. The outer piston 35 and the inner end face of the piston housing provide a second control chamber 40 for piston 35. It will be seen that this latter-mentioned piston has an extending portion 43 which projects through the slot 33 and is adapted to contact the stationary reaction brake or friction-drive-establishing device 45 which is provided by steel discs splined to the exterior of piston housing 29 and friction discs splined to the interior of transmission case 47.

The inner piston has an annular portion 48 which is adapted to contact and pack a dynamic clutch or friction-drive-establishing device 49 concentric with device 45 and having steel plates splined to an inner portion of the piston housing 29 and friction discs splined to direct clutch hub 51 secured to be rotatably driven by shaft 11. As best shown in FIG. 2, chamber 40 behind the outermost piston is connected by passages 55 and 57 to line pressure through a 1–2 shift valve, not shown, while chamber 39 is connected by passages 59 and 60 to line pressure through the 2–3 shift valve, also not shown.

Regarding FIG. 2 in particular, it will be seen that piston return spring 63 is seated between the inner face of piston 35 and a reaction disc 65 that is secured to the housing 29 to bias the piston away from engagement with the clutch 45. Spring 67 is similarly positioned between piston 37 and reaction disc 69 coupled to the housing for a similar purpose in relation to clutch 49. Vent 71 extending through the piston 37 is controlled by a ball 73 to allow evacuation of chamber 39 under certain operating conditions to prevent inadvertent apply of piston 37 to clutch 49.

The piston housing is mounted for rotation by bearings 75 on the support shaft 77, in turn mounted on rotatable shaft 11 by bearings 79. Passage 80 is a lube passage for the transmission. The planetary gear unit 23 includes a carrier 81 which is connected by a short shaft 83 to a large diameter sun gear 85 of a compound planetary gear set 87. This latter gear set is a power-combining or speed differential gear unit and provides full range and reverse drives and additionally provides combined forward drives. As shown, this unit includes a small diameter sun gear 89 which is coupled to and driven by shaft 11. Short pinions 91 mesh with this latter sun gear and also mesh with long pinions 93 which, in turn, mesh with ring gear 95 and sun gear 85. The ring gear 95 carries hub portion which supports friction plates which, with friction discs splined to housing 47, provide friction-drive-establishing device or ring brake 97 that is controlled by motor means such as piston 98. The carrier 81, leading from the first gear unit into the second or speed differential unit, includes an annular drum 99 having an exterior braking surface 101 which, when engaged by brake band 103 operated by servo mechanism, will retard rotation of the sun gear 85. The meshing planets of the power unit are rotatably mounted to a carrier 104 which is connected to an output shaft 105 that may be connected to vehicle drive wheels in any suitable manner such as through a differential unit.

For low range operation the brake band 103 is applied by actuation of a manual control valve to pressurize the apply side of a control servo, not shown, to tighten the band and retard rotation of drum 99 and connected sun gear 85 of the speed differential gear unit. With the sun gear 85 providing reaction and turbine input through the sun gear 89, the carrier 104 and connected output shaft 105 will be driven at a highly reduced speed with greatly increased torque. During this time the piston housing 29 and the pistons therein will be driven in a reverse direction by the ring gear 27 of the power-dividing gear unit.

For second range, automatic operation of the 1–2 shift valve feeds line pressure oil into chamber 40 behind the apply area of the large piston 35 and the release area of the low band servo. When chamber 40 fills and line pressure overcomes the retarding force of return spring 63, piston 35 will move into engagement with the plate pack of brake 45 to take up the clearance in the pack, which does not at this time have torque-reaction capacity. However, the band 103 remains applied, holding gear 85 for low range drive. As the pressure rises in chamber 40, the pack is compressed gaining torque reaction capacity as the band loses capacity. Finally, a condition is reached when band 103 has no capacity and device 45 has high torque capacity. The movement of the ring gear 27 is thus retarded and held for reaction, grounded through the brake 45 to the transmission case 47. The clutch housing will also be held from rotation at this time. With the ring gear 27 thus held for reaction and with sun gear input into the power-dividing gear unit, the sun gear 85 will be driven by carrier 81 at a reduced speed while the sun gear 89 is being driven by the shaft 11 at turbine speed. When the two sun gears of the speed differential unit are thus driven, the carrier 104 and connected output shaft 105 will be driven at a faster speed than at low range operation but with reduced torque multiplication.

For high range operation the chamber 39 is furnished with pressure oil by automatic operation of the 2–3 shift valve. When chamber 39 fills, pressure rises to exert increased force on the apply area of piston 37 and the substantially equal release area of piston 35. When the force on the apply area of piston 37 equals the retraction force of spring 67, the piston 37 will move forward to take up clearance in clutch pack 49 with pressure remaining constant in chamber 39. Because of accumulator action of chamber 39, due to movement of piston 37, the pressure in chamber 39 is low and the clutch 49 does not have torque-transmitting capacity at this time. However, since chamber 40 is still pressurized, the friction pack of brake 45 has torque reaction capacity so that ring gear 27 will still be held for reaction. When piston 37 completes its travel, pressure rises quickly and the increased force on the release area of the piston 35, plus the force of spring 63, approach the force exerted by line pressure on the apply area of piston 35. During this pressure rise or transition period both the brake and clutch have limited torque capacity; brake 45 loses capacity and clutch 49 gains torque capacity but still slips. When the opposing forces on piston 35 are equal, the brake 45 has no capacity and a small increase in pressure causes the piston 35 to move to the off position. This movement of piston 35 provides accumulator action by increasing the volume of chamber 39 so that the rate of pressure rise in chamber 39 is reduced for soft engagement of clutch 49 to stop slip. When piston 35 stops moving the clutch piston 37 then completes its engagement as pressure rises quickly until the force of the piston is the force of full line pressure. When piston 37 has completed its travel, the sun gear 21 and the ring gear 27 are effectively connected for 1:1 drive. It will be appreciated that the carrier 81 now drives the sun gear 85 at the same speed that shaft 11 drives sun gear 89. This locks up the power-combining and speed differential gear set for high range operation. The particular friction-drive-establishing device described thus provides for controlled torque capacity overlap between the various ratios and an the 2–3 shift this control is substantially improved by virtue of common control chamber 39.

From the above detailed description and drawings of one embodiment of applicant's invention, it will be readily appreciated that applicant has provided a new and improved multi-speed transmission controlled by a limited number of clutches and brakes. In applicant's invention soft overlap shifts are accomplished by utilizing a common control chamber for gradually releasing a reaction friction device to release a control or reaction gear of a planetary gear set while simultaneously and gradually engaging a torque-transmitting friction device to connect the control gear to an input power shaft for torque transmittal. Furthermore, only two control chambers are used in shifting between second and third drive ranges.

It will be further understood that applicant's specifically described arrangement is shown and described for illustrative purposes and not for purposes of limiting the invention. The particular structure disclosed may be modified to suit various situations by those skilled in the art and this invention is therefore to be restricted only by that which is set forth in the claims which follow.

I claim:

1. In a power transmission having an input and an output, a transmission case, a gear unit having an input member and an output member and a control member, means operatively connecting said input member to said transmission input, means operatively connecting said output member to said transmission output, separate first and second selectively engageable friction-drive-establishing devices operatively connected to said control member, said first friction-drive-establishing device being a brake having friction plates supported by said case, first and second fluid operated motor means for said first and second friction-drive-establishing devices defining a control chamber therebetween, a housing for said motor means, said housing and one of said motor means defining a second control chamber, said last mentioned motor means having a contact portion which extends outside of said housing for contacting said brake, means for supplying pressure fluid to said second control chamber to effect the selective engagement of said first friction drive establishing device by said first motor means to retard rotation of said control member and to condition said gear unit for a first ratio, and means for supplying pressure fluid to said first mentioned control chamber to effect a graduated release of said first friction-drive-establishing device and a graduated engagement of said second friction-drive-establishing device to condition said gear unit for a different drive ratio without interruption in transmittal of power by said transmission.

2. In a power transmission having an input and an output, a transmission housing, a gear unit having an input member and an output member and a control member, power transmitting means operatively connecting said input member to said transmission input, power transmitting means operatively connecting said output member to said transmission output, separate first and second selectively engageable friction-drive-establishing devices operatively connected to said control member, said first friction-drive-establishing device being a brake directly grounded to said transmission housing for directly braking said control member, first and second fluid operated motor means for said first and second friction-drive-establishing devices defining a control chamber therebetween, a housing for said motor means, said housing and one of said motor means defining a second control chamber, fluid conducting means for supplying pressure fluid to said second control chamber to effect the selective engagement of said first friction-drive-establishing device by said first motor means to retard rotation of said control member and to condition said gear unit for a first ratio, and fluid conducting means for supplying pressure fluid to said first mentioned control chamber to effect a graduated release of said first friction-drive-establishing device and a graduated engagement of said second friction-drive-establishing device to condition said gear unit for an overlap ratio shift.

3. In a power transmission having an input and an output, a gear unit having an input member and an output member and a control member, means operatively connecting said input member to said transmission input, a selectively engageable brake and a selectively engageable clutch operatively connected to said control member, drive means for said clutch drivingly connecting said clutch to said first mentioned means and to said input member, first and second fluid operated motor means for said brake and clutch, said second motor means being mounted within said first motor means to define a control chamber therebetween, a housing for said first and second motor means, said housing and said first motor means defining a single control chamber therebetween, means for supplying pressure fluid to said last mentioned control chamber to cause the selective engagement of said brake by said first motor means and the braking of said control member for conditioning said gear unit for a first ratio, and means for supplying pressure fluid to said first mentioned control chamber to effect a graduated release of said brake and a graduated engagement of said clutch to condition said gear unit for a different drive ratio without interruption in transmittal of power by said transmission.

4. In a power transmission, an input and an output, a gear unit having an input member operatively connected to said transmission input and an output member and a control member, means operatively connecting said output member to said transmission output, first and second selectively engageable friction-drive-establishing devices operatively connected to said control member, said friction-drive-establishing devices being concentric with respect to each other, first and second pistons for respectively actuating said first and second friction-drive-establishing devices, a housing for said pistons, said first piston and said housing providing a control chamber therebetween, said first piston having a single apply area forming a wall of said chamber, said first piston having a contact portion extending through said housing for engaging said first device, said second piston being telescopically mounted within said first piston to define a second control chamber therebetween, means for supplying working fluid to said first chamber to effect engagement of said first friction-drive-establishing devices to condition said gear unit for a first gear ratio, means for supplying working fluid to said second mentioned chamber to effect engagement of said second friction-drive-establishing devices with the simultaneous release of said first friction-drive-establishing device to effect an overlap shift from said first ratio to a second ratio.

5. In a power transmission having an input and an output, a power dividing gear unit having an input member and an output member and a control member, means operatively connecting said input member to said transmission input, a power combining gear unit having an input member and an output member and a control member, means connecting said last mentioned output member to said transmission output, power transmitting means operatively connecting said input members of said gear units, power transmitting means operatively connecting said output member of said power dividing gear unit to said control member of said power combining gear unit, a selectively engageable friction device operatively connected to said control member of said power combining unit engageable to condition said transmission for a low speed ratio, selectively engageable brake means operatively connected to said control gear of said power dividing unit engageable to condition said power dividing unit for a predetermined speed ratio and said transmission for a higher speed ratio, and selectively engageable clutch means operatively connected to said input member and said control member of said power dividing gear unit engageable to condition said transmission for a speed ratio higher than said last mentioned speed ratio.

6. The power transmission of claim 5, said power combining gear set having another control member, and braking means operatively connected to said last mentioned control member and engageable to retard rotation thereof to condition said transmission for reverse drive ratio.

7. In a power transmission having an input and an output, a transmission case, a power dividing planetary gear unit mounted in said case having an input member operatively connected to said transmission input and a control member and an output member, a power combining planetary gear set having an input operatively connected to said output member and another input operatively connected to said transmission input, and an output operatively connected to said transmission output, a first selectively engageable friction-drive-establishing device operatively connected to said power combining gear set engageable to condition said transmission for a low drive range, second and third selectively engageable friction-drive-establishing device operatively connected to said control member of said first gear unit, said second friction-drive-establishing device being a brake grounded directly to said case, said third friction drive establishing device being a clutch operatively connected to said input member of said first unit, first and second pistons for respectively actuating said second and third friction drive establishing device, a housing for said pistons rotatably mounted in said case, said first piston and said housing providing a control chamber therebetween, said first piston having a constant apply area forming a wall of said chamber, said first piston having a contact portion extending through said housing for engaging said brake, said third piston being telescopically mounted within said first piston to define a second control chamber therebetween, means for supplying a working fluid underpressure to said first chamber to move said second piston into engagement with said brake to condition said transmission for an intermediate drive range when said first selectively engageable friction device is disengaged, means for supplying working fluid under pressure to said second mentioned chamber to move said third piston into engagement with said clutch and said second piston from engagement with said brake to effect an overlapped shift from said intermediate ratio to a high-range ratio.

References Cited
UNITED STATES PATENTS

| | | | |
|---|---|---|---|
| 2,870,655 | 1/1959 | Rockwell | 74—785 |
| 3,069,929 | 12/1962 | Hansen | 74—785 |
| 3,090,257 | 5/1963 | Schjolin et al. | 74—781 |
| 3,303,726 | 2/1967 | Christenson | 74—751 |

DONLEY J. STOCKING, *Primary Examiner.*

LEONARD H. GERIN, *Examiner.*